United States Patent
Cleveland et al.

(12)

(10) Patent No.: US 6,357,907 B1
(45) Date of Patent: *Mar. 19, 2002

(54) MAGNETIC LEVITATION STIRRING DEVICES AND MACHINES FOR MIXING IN VESSELS

(75) Inventors: Patrick H. Cleveland; John R. Markle, both of San Diego, CA (US)

(73) Assignee: V & P Scientific, Inc., San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,589

(22) Filed: Jun. 15, 1999

(51) Int. Cl.[7] ............................................... B01F 13/08
(52) U.S. Cl. .......................................... 366/273; 422/64
(58) Field of Search ......................................................
(58) Field of Search ................................. 366/273, 274; 422/64

(56) References Cited

U.S. PATENT DOCUMENTS

| | | | |
|---|---|---|---|
| 4,911,555 A | * | 3/1990 | Saffer et al. |
| 5,272,092 A | * | 12/1993 | Hamasaki et al. |
| 5,705,062 A | * | 1/1998 | Knobel |
| 6,033,574 A | * | 3/2000 | Siddiqi |
| 6,176,609 B1 | | 1/2001 | Cleveland et al. |

FOREIGN PATENT DOCUMENTS

JP          2-152536      *   6/1990

OTHER PUBLICATIONS

PTO: 2000–2762 English translation of JP 2–152536.*

* cited by examiner

Primary Examiner—Charles E. Cooley
Assistant Examiner—David L. Sorkin
(74) Attorney, Agent, or Firm—Edward W. Callan

(57) ABSTRACT

The invention provides a simple method, devices and several machines for simultaneously stirring and aerating thousands of vessels or wells of microplates in a robust manner and with economy. This method uses the simple principle of magnetic stirrers being levitated vertically when passed laterally or vertically through a strong horizontal dipole magnetic field. The dipole magnetic fields may be produced by using permanent magnets, electromagnets or a modulating/reversing electro-magnetic field. Each vessel contains a magnetic ball, disc, bar, dowel or other shape (stirrers) which in their magnetic attraction to the dipole magnetic field will cause the stirrers to levitate up in the vessel as the stirrer's magnetic poles attempt to align with the center of the dipole's magnetic field. The stirrers will fall to the bottom of the vessel by gravity or by changing the relative position of the levitating magnetic field to pull them down, or by passing the vessel laterally over another magnetic field. The up and down movement of the stirrers provides a vigorous mixing of the contents of many vessels at same time. If the level of the vessel's meniscus is situated so the stirrers pass through it on their way up and down, the air/liquid interface is significantly increased thereby significantly increasing aeration of the liquid.

22 Claims, 7 Drawing Sheets

MAGNETIC LEVITATION STIRRING DEVICES AND MACHINES FOR MIXING IN VESSELS

BACKGROUND—Field of Invention

This invention provides a method, devices and machines to uniformly and simultaneously mix in tall vessels in such a manner as to increase the aeration of the liquid. The purpose is to provide a robust method, economical devices and very simple machines to uniformly stir and aerate the contents of one tall vessel or thousands of tall vessels, vials, test tubes or deep well microplate wells (6 well, 12 well, 24 well, 48 well, 96 well, 384 well, 864 well, 1536 well, 10,000 well, "U" bottom, "V" bottom, PCR and other deep well versions of those microplates) at the same time.

BACKGROUND—Description of Prior Art

Suspending particulates in liquids, breaking up aggregates, aeration of gases in liquids, dissolving solids in liquids, emulsifying two liquids or mixing liquids together has usually been accomplished in large vessels, bottles, flasks and test tubes by magnetic horizontal spin stirring, orbital shakers, vortexing, rocking platforms, bubblers, vibrators or magnetic tumble stirring. In an effort to miniaturize many of the operations that were done in bottles, flasks and test tubes, scientists have shifted to deep well multi well microplates (24 deep well, 48 deep well, 96 deep well, and 384 deep well). Other deep well plates will undoubtedly follow. These deep wells are characterized by a tall vertical height and a very small air surface to volume ratio, thus making aeration difficult. Deep well microplates are now commonly used in a wide variety of scientific applications to act as mini-reaction or culture vessels for liquid assays. However, because of the combination of the tall height of the column of liquid, small air surface area to volume ratio and the significant attraction of liquid surface tension forces to the walls of small diameter wells (especially in the 48, 96, and 384 deep well microplates) it is not possible to adequately resuspend particulates, aerate gases into liquids, stimulate the growth of microorganisms, break up aggregates, break open cells, emulsify two liquids, mix two liquid reagents, or to dissolve a solid in a liquid by simple agitation on an orbital shaker, vortexer, rocker platform, bubbler or by vibration without generating a force so violent that it would throw the liquids out of the miniature vessels.

Magnetic horizontal spin stirring has been adapted to 96 well microplates by VARIOMAG-USA. They put spinning permanent magnet stirrers into the wells of a 96 well microplate and place the 96 well microplate on a magnetic stirring system with an individual modulated (driving) electromagnetic stir point engineered under the center of each well. The placement of the wells exactly over a stir point is critical so the spinning stirrers don't hit the well walls and lose synchronization with the driving electromagnetic field, causing them to vibrate in the wells. If they hit the well wall the whole stirrer has to be stopped repositioned and slowly started spinning again. Often when the stir point system is rapidly spinning, the stir magnets in individual wells get out of synchronization with the driving electromagnetic field for no apparent reason or due to the vibration of the stirring action moving the plate. Part of this sensitivity phenomena is due to the physics of the interaction of the magnetic fields of the driving electromagnet and the spinning magnetic stirrer which line up parallel to each other, thus resulting in a weaker magnetic coupling than if the poles were directly opposed to each other. This weak magnetic coupling also is demonstrated if there is a differential viscosity between the liquids of different wells of the same microplate, as this will slow the stirrers in those wells and throw those magnetic stirrers out of synchronization. The cost of this magnetic stir point system is $2,400.00 for each 96 well plate and the cost of the individual stirring magnets for each well is $2.45 thus bringing the total cost to stir each plate to $2,635.00. Furthermore a unique stir point configuration (6, 12, 24, 48, 96, 384, 1536, and 10000 wells) is required for each well configuration of the microplate well format used. Because of these technical and cost considerations this system has not been widely used.

In a previous patent application Ser. No. 09/170,459, now U.S. Pat. No. 6,176,609, we invented and applied "Magnetic Tumble Stirring" as a method to stir the contents of microplates. Magnetic Tumble Stirring consists of stainless steel magnetic stir discs, bars and dowels of different dimensions, shapes and with magnetic field orientations through the long axis so that they will provide a vigorous stirring action when they are tumbled end over end through the long axis in a vertical magnetic field(s). By making the magnetic stirrers nearly the same diameter or length as the diameter of the vessel they are stirring or by putting multiple magnetic stirrers into a single vessel a very significant stirring action is effected when they tumble through the magnetic axis. Magnetic Tumble Stirring in the vertical plane is produced by the magnetic poles of stirrers inside vessels being attracted to an opposite vertically oriented drive magnetic field produced by a permanent magnet or an electromagnet under the vessel. This vertical magnetic attraction causes the stirrers to stand on a polar end and then fall when either the drive magnetic field or the vessels are moved laterally in respect to each other and the stirrer can not maintain the vertical orientation because of the wall of the vessel or friction with the well bottom. Although this method works well with microplates that have short to medium columns of liquid above them, it is not as effective with the taller deep well microplates. Furthermore it is does not effectively aerate the liquid.

Another way to provide adequate mixing and aeration in microplates is by pipetting the contents of each well up and down. This can be done manually or by robotic work stations. There are several robotic work stations that will do this pipet mixing operation, but they will just mix 4, 8 or 12 wells at a time and the pipets must be washed or changed between wells. Recently Robbins Scientific introduced the "Hydra" work station which will pipet and mix 96 wells at a time but it costs ~$30,000 and is still laborious as the pipets must be washed between wells. Furthermore, it would be economically impossible to do continuous mixing of multiple microplates simultaneously by pipetting. In addition, it would be difficult to place a whole large robotic workstation in an incubator if microorganisms were the objects being mixed while culturing. Thus, the miniaturization of continuous mixing processes on a large number of microplates remains impractical until now.

OBJECTS AND ADVANTAGES

Thus it is the object of the method, devices and machines to provide a very simple process of uniformly mixing and aerating the contents of thousands of vessels, vials, test tubes and deep well microplates. We have made stainless steel magnetic stir balls, discs, bars, and dowels of different dimensions, shapes so that they will fit into any vessel and provide a vigorous stirring action when they are levitated by a magnetic field, then dropped by gravity or pulled down by the same or another magnetic field. By making the magnetic stirrers nearly the same diameter or length as the diameter of the vessel they are stirring or by putting multiple magnetic stirrers into a single vessel, a very significant stirring action is effected when they levitate up and down through the liquid. When the stirrers are levitated through the liquid meniscus it significantly increases the liquid's surface area and therefor increases aeration. We have discovered that while stainless steel is commonly thought to be non-magnetic, several stainless steels that have been "hardened", "spring tempered" or "cold worked," are magnetic. Because stainless steel is corrosion resistant, it maybe used as a magnetic stirrer without any protective coating, like teflon, thus making stainless steel magnetic stirrers very inexpensive.

Magnetic levitation stirring is produced by placing the vessel with the stirrers in the middle of a strong laterally focused magnetic field. Thus the stirrers are pulled to the wall of the vessel and raised to the height of the center of the magnetic field. By raising or lowering the vessel or the magnetic field one can move the stirrers up and down within the vessel. You can also raise and lower the stirrers by moving the vessels laterally through a focused magnetic field or moving the magnetic field laterally past the vessels. This lateral movement method relies on gravity to pull the stirrers down to the bottom of the vessel after the vessel passes through the magnetic field. In cases where the liquid is viscous, a magnet located along the path of lateral movement but below the vessel may be used to "pull" the stirrers to the bottom of the vessel. Magnetic levitation has the advantage of being able to stir and aerate tall columns of liquids with ease as it can be effected by simple vertical or lateral motion of either the vessel or the magnetic field.

It is also the object of the machines, device and method to provide a robust, economical and practical mixing method to resuspend particulates, to dissolve a solid in a liquid, to mix two or more liquid reagents, to emulsify two or more liquids, to break up aggregates, break up filamentous organisms, stimulate the growth of microorganisms, break open cells, or to mix and immobilize magnetic beads in vessels or microplate wells. The positive physical displacement of the liquid and particles by the levitation action of the stirrer produces a robust mixing or movement of the liquids and solids in the well. In the case where extracts are dried in the bottom of wells to be later suspended, the direct physical contact between the stirrer and the extract is often critical in the dissolving of the extract. Physical contact is also important in mixing oil and water to make an emulsion. This direct physical contact cannot be duplicated by orbital shaking, vortexing, rocker platform or vibration. Furthermore, the power of the levitation action is such that it will stir even viscous material like pure glycerol, aggregates, emulsions and heavy suspensions of particulates that can not be stirred by the electronic stirring point system of the Variomag.

The lateral motion version of the invention ("Carousel Version") uses one or more magnetic dipole tunnels through which the vessels to be stirred are moved laterally on a carousel wheel. One of the advantages of the Carousel Version is that many vessels may be stirred by just one dipole magnet. Another is the simplicity of the motion used to affect the stirring. A third advantage is that if you use multiple dipoles you can alternate the polarity (S-N and N-S) of the dipole magnetic field and the stir devices would not only levitate but would "tumble" and reverse their physical orientation as they align to the magnetic polarity of alternating (S-N and N-S) dipole magnetic fields.

The vertical motion version of the invention ("Elevator Version") uses a single massive magnetic dipole shaft in which the vessels (the elevator car) are raised and lowered to raise and lower the stirrers inside the vessels. One of the advantages of the Elevator version is that it is more compact and is able to use the same magnetic field to also pull the stirrer down in viscous liquids. Because of it's compact nature it will fit into standard incubators so cultures can be stirred and aerated.

In both versions the speed of stirring and the amplitude of the stirring motion are easily controlled. Also the vigor of stirring action is also controlled by the size and shape of the stirrer placed in the vessel and can be changed to accommodate liquids of different viscosities or particulates of differing sizes.

We have also developed simple dispensing systems that will efficiently place the various stir devices (balls, discs, bars or dowels) into all the wells of a microplate (from the 6 well microplate to the 1536 well microplate) in a single step. Thus the technical process of placing stirrers in microplates for Magnetic Levitation Stirring is easy.

Also the process of removing the stirrers is simple. Just place a powerful magnet over the top of the microplate or a replicator with magnetic pins to extract the stirrers. Furthermore unlike the single 96 well microplate that a Hydra work station pipetter can mix only one microplate at a time, the Carousel Version Stirrer is able to mix 12 or more microplates simultaneously as they pass through levitation tunnels and pull down stations. The only limitation to the number of vessels that can be stirred is the diameter of carousel that can be accommodated. Furthermore the Hydra work station pipetter must wash each of the pipets between microplates to avoid contamination. Although pipetting the contents of wells up and down will provide adequate mixing and aeration, this is a very laborious, cumbersome operation that can not be done in processes that require continuous mixing such as microbial culturing.

Carousel Magnetic Levitation Stirrers cost under $22,500 and the stir balls, discs, bars and dowels are very inexpensive (from $0.03 to $0.15 each). Furthermore the stirrers can be reclaimed, washed, sterilized and reused over and over again because they are made from stainless steel. Thus the setup cost of tumble stirring for twelve 96 well microplates including stirrers is $1,932.60 compared to $2,635.00 for the Variomag and $30,000 for the Hydra pipetting work station. Furthermore it is not clear that the Variomag will even stir deep well microplates as the bottom of these wells are cup shaped and have ridges and there are no reports or claims that the Variomag will stir deep well microplates.

It is also an object of this device to be small enough to fit inside standard culture incubators so that microbial cultures can be stirred while growing. The Elevator Version of the Magnetic Leviatation Stirrer is 12" wide by 17" long by 16" high and thus will fit into the 18" wide door on most culture incubators.

It is also an object of this device to be made as large or as small to fit the application at hand.

It is also an object of this device to have a speed controller attached to the device so as to determine the speed or vigor of mixing.

Still further objects and advantages will become apparent from a consideration of the ensuing description and accompanying drawings.

SUMMARY

The invention provides a simple method, device and machines for simultaneously stirring and aerating thousands of vessels or wells of microplates in a robust manner and with economy. This method uses the simple principle that magnetic stirrers inside vessels are held suspended in the middle of very strong magnetic fields and can be moved up (levitated) and down by either moving the magnetic field up and down around a stationary vessel, moving the vessel up and down in a stationary magnetic field or moving the vessel laterally into and out of a strong magnetic field. The dipole magnet design is superior for this application as even stirrers at great distance from the magnet poles can be levitated. In the lateral motion (carousel design) a pull down magnet placed under the vessel after it emerges from the lateral magnetic field may be used to assist gravity in instances where highly viscous liquids are involved. This is not necessary with the Elevator design as same magnetic field is used to lower the stirrers.

The stirring action produced by both the Carousel and Elevator designs are very mechanically vigorous as it stirs tall columns of liquid from top to bottom with significant liquid movement. Furthermore because the stir device passes through the liquid meniscus it increases the air/liquid interface and therefore significantly increases aeration of the liquid. The Carousel Version provides for the economical stirring of many microplates at once.

DESCRIPTION OF INVENTION

Figure 1:
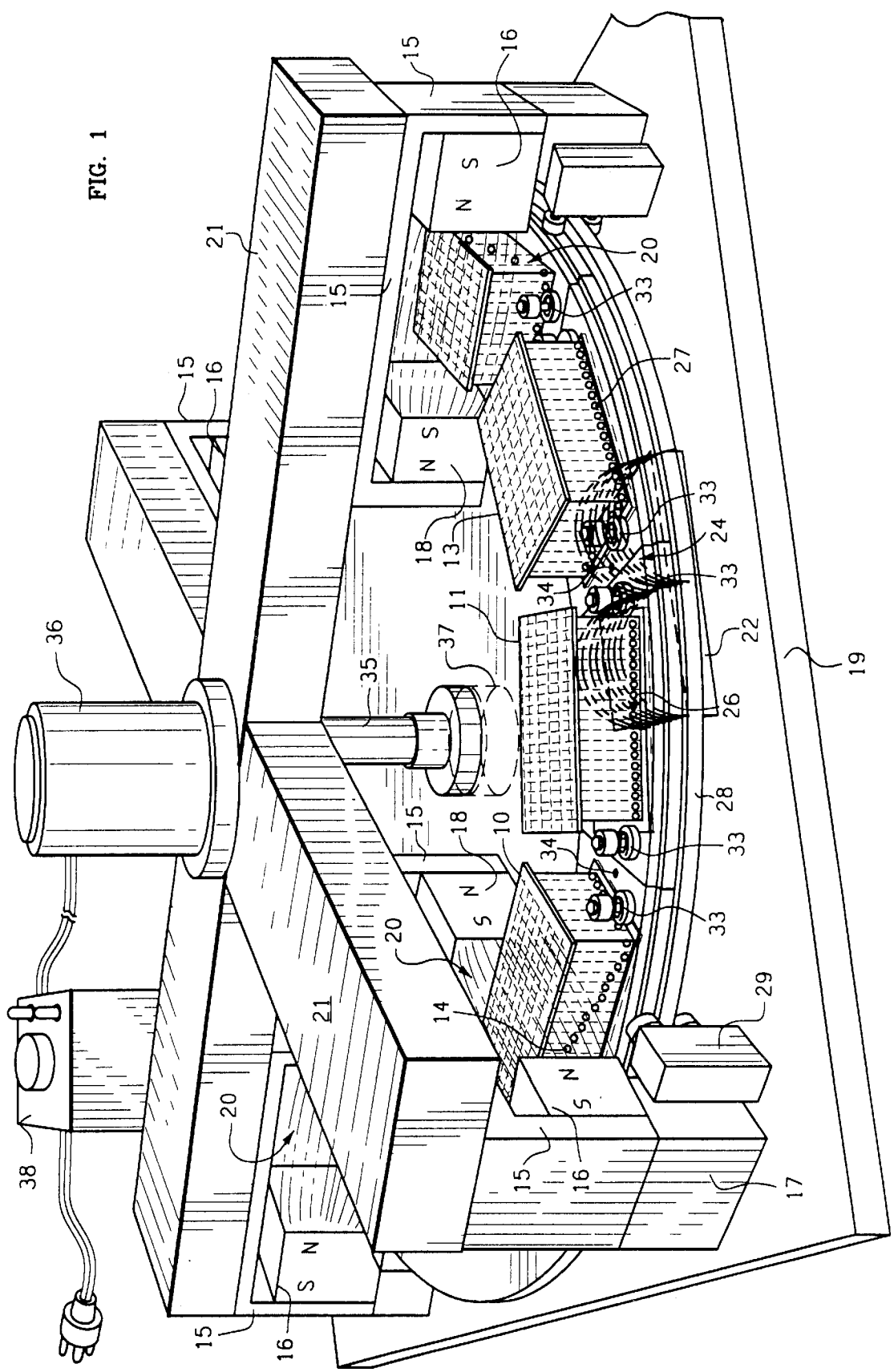
FIG. 1 illustrates a perspective view of the Carousel Version with levitated and pulled down stir balls in microplate wells.

FIG. 1 illustrates how stir balls (14) are levitated as they enter the dipole focused levitation magnetic field (20) of the carousel levitation magnets (16 & 18) with their focusing dipole superstructure (15). As the deep well microplate (10) approaches the dipole focused magnetic levitation field (20) the stir balls (14) in the leading wells (12) are levitated. The closer to the dipole focused magnetic field (20) the greater the levitation. The stir balls (26) in the trailing deep well microplate (11) are pulled down to the bottom of the deep well microplate by the magnetic field (24) of a pull down magnet (22) located on the base plate (19) under the carousel wheel plate (28). The unaffected stir balls (27) in the third deep well microplate (13) are not influenced by either the dipole focused levitation magnetic field (20) or the pull down magnetic field (24) as they are between both magnetic fields. The steel dipole structure (15) is attached to the base plate (19) through an aluminum support column (17) so it acts as a cantilever to support the levitation magnets (16 & 18) over the carousel wheel plate (28) without touching it. A cross member motor support structure (21) is attached by bolts to the dipole (15) structure for structural support of the motor. The deep well microplate (10) is placed into a microplate holding shoe (32) which prevents the microplate from moving side to side, end to end or up and down by using spring clips (33). The microplate holding shoe (32) and a height adjusting shim (30) are fastened with screws (34) to the carousel wheel plate (28). Shims (30) of different thickness may used interchangeably to raise or lower the deep well microplate (10) and therefore the height to which the levitation stir balls (14) are lifted as they pass through the levitation magnetic field (20). The speed or number of levitations per minute is determined by motor speed which is regulated by a controller (38).

Figure 2:
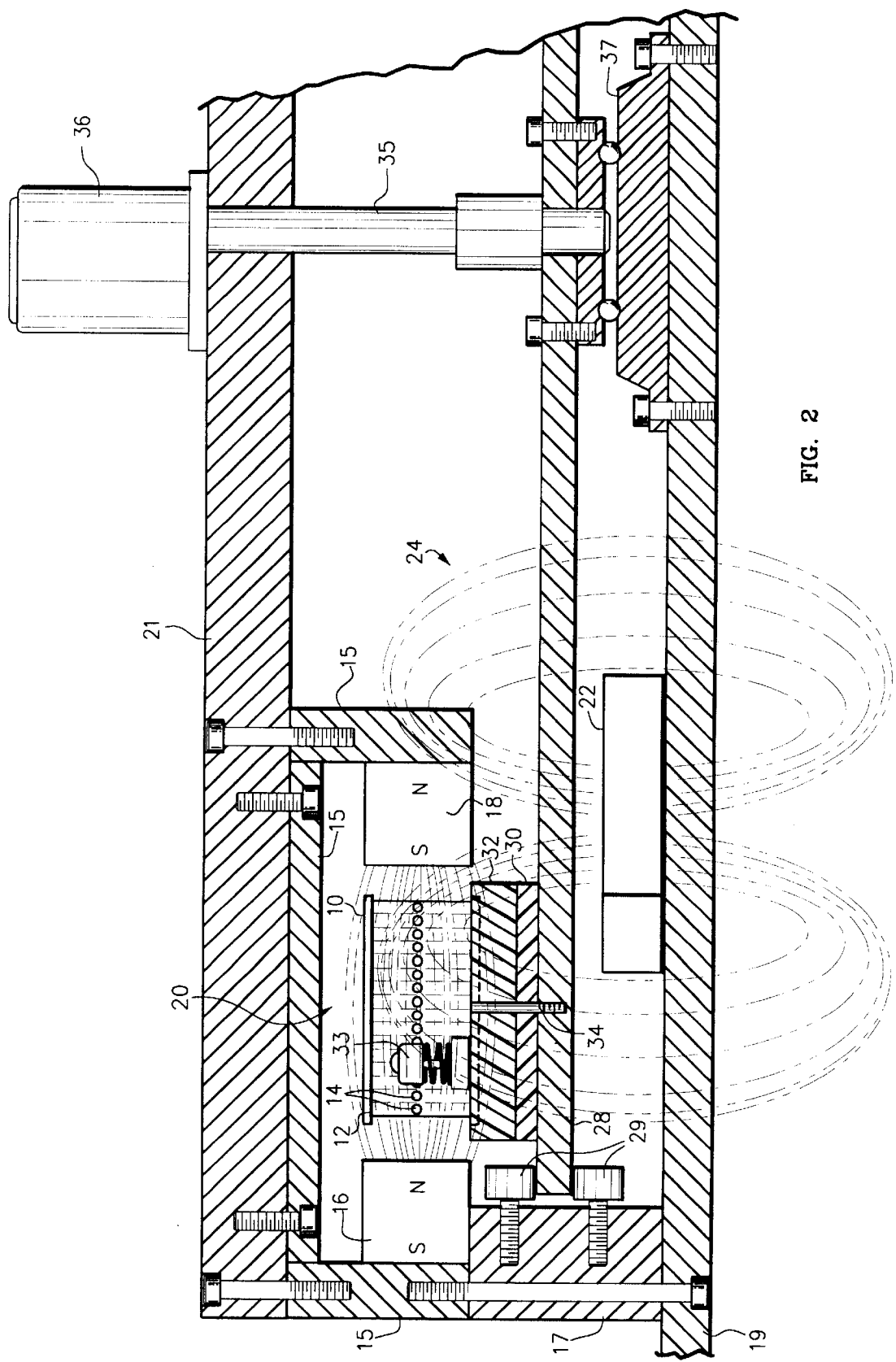
FIG. 2 illustrates an end view of levitated stir balls in microplate wells on the Carousel Version.

FIG. 2 illustrates how stir balls (14) are levitated in a straight line in the center of the dipole focused levitation magnetic field (20) produced by carousel levitation magnets (16 & 18) with their focusing dipole superstructure (15). The steel dipole structure (15) is attached to the base plate (19) through an aluminum support column (17) so it acts as a cantilever to support the levitation magnets (16 & 18) over the carousel wheel plate (28) without touching it. A cross member motor support structure (21) is attached by bolts to the dipole (15) for structural support of the motor (36). The motor drive shaft (35) projects down and attaches to the carousel wheel (28) and rests in a bearing (37) mounted in the base (19). The carousel wheel is supported on the perimeter by 4 wheel support bearings (29) fixed to the dipole support (17). The deep well microplates (10) are placed into microplate holding shoes (32) which prevents the microplate from moving side to side, end to end or up and down by using spring clips (33). The microplate holding shoe (32) and a height adjusting shim (30) are fastened with screws (34) to the carousel wheel plate (28). Shims (30) of different thickness may used interchangeably to raise or lower the deep well microplate (10) and therefore the height to which the levitation stir balls (14) are lifted as they pass through the levitation magnetic field (20).

Figure 3:
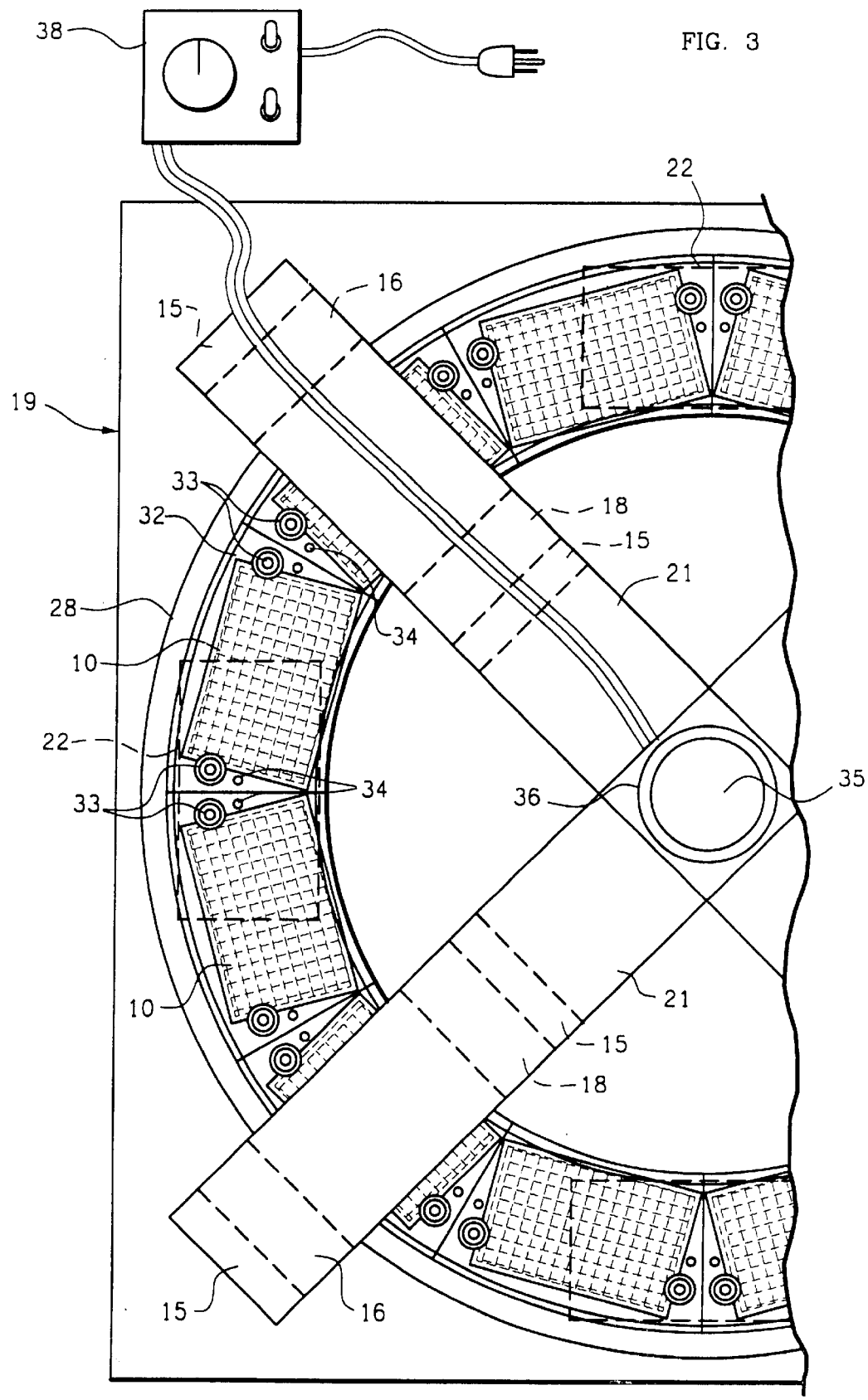
FIG. 3 illustrates an exposed top view of the Carousel Version form of the invention.

FIG. 3 is a top view of the Carousel Version that illustrates how the motor (36) is suspended over the center of the carousel wheel by four cross member motor support structures (21) which are attached to all four opposing dipole structures (15). The steel dipole structures (15) beneath the cross member support structure (21) form the means to secure it to the base (19). Deep well microplates (10) are slipped laterally into microplate holding shoes (32) and held down vertically with spring clips (33). When the motor drive shaft (35) turns, the carousel wheel (28) spins and deep well microplates (10) are moved through the focused magnetic field (20) of the dipole structure (15), over the pull down magnetic fields (24) and the stir balls are levitated and pulled down to effect stirring and aeration.

Figure 4:
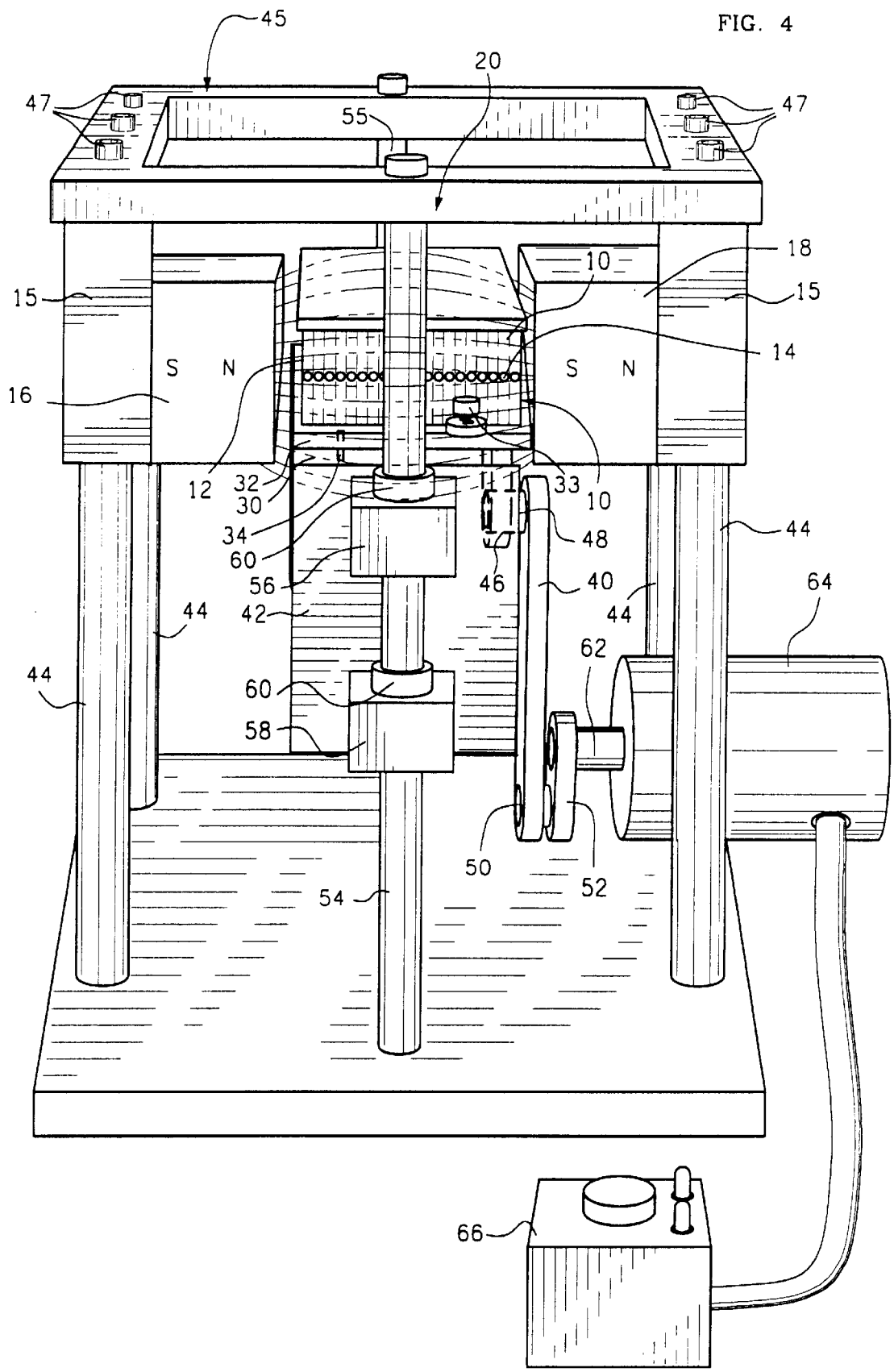
FIG. 4 illustrates a perspective side elevation view of the Elevator Version with levitated stir balls in a deep well microplate.

FIG. 4 illustrates how stir balls (14) are levitated as they enter the dipole focused levitation magnetic field (20) of the elevator levitation magnets (16 & 18) with their focusing dipole superstructure (15). As the deep well microplate (10) is lowered into the dipole focused magnetic levitation field (20) the stir balls (14) in the wells (12) are levitated. The lower the microplate (10) in the dipole focused magnetic field (20) the greater the levitation. The bottom of the steel dipole structure (15) is attached to the base plate (19) through aluminum support columns (44) to support the levitation magnets (16 & 18). A cross-membered slide rail support structure (45) is attached by bolts (47) to the top of the dipole (15) structure for structural support of the slide rails (54 & 55). The deep well microplate (10) is placed into a microplate holding shoe (32) which prevents the microplate from moving side to side, end to end or up and down by using spring clips (33). The microplate holding shoe (32) and a height adjusting shim (30) are fastened with screws (34) to the elevator platform (42). Shims (30) of different thickness may used interchangeably to raise or lower the deep well microplate (10) and therefore the height to which the levitation stir balls (14) are lifted as they are moved up and down in the levitation magnetic field (20). The elevator platform (42) is raised and lowered by sliding it up and down on the two slide rails (54 & 55) via four bearings (60) attached to upper (56) and lower (58) slide rail brackets on each side of the elevator platform (42). The up and down movement of the elevator platform (42) is produced by the drive shaft (62) of the motor (64) turning a crank shaft (52) which is attached to the elevator drive arm (40) via the crankshaft bearing (50). The elevator drive arm (40) is connected to the elevator platform (42) via the elevator platform joint (48) and a connecting pin (46). As the motor (64) turns the crankshaft (52), the linkage system converts the rotary motion into a reciprocating motion and the elevator platform (42) moves up and down. The speed of the motor is regulated by a controller (66).

Figure 5:
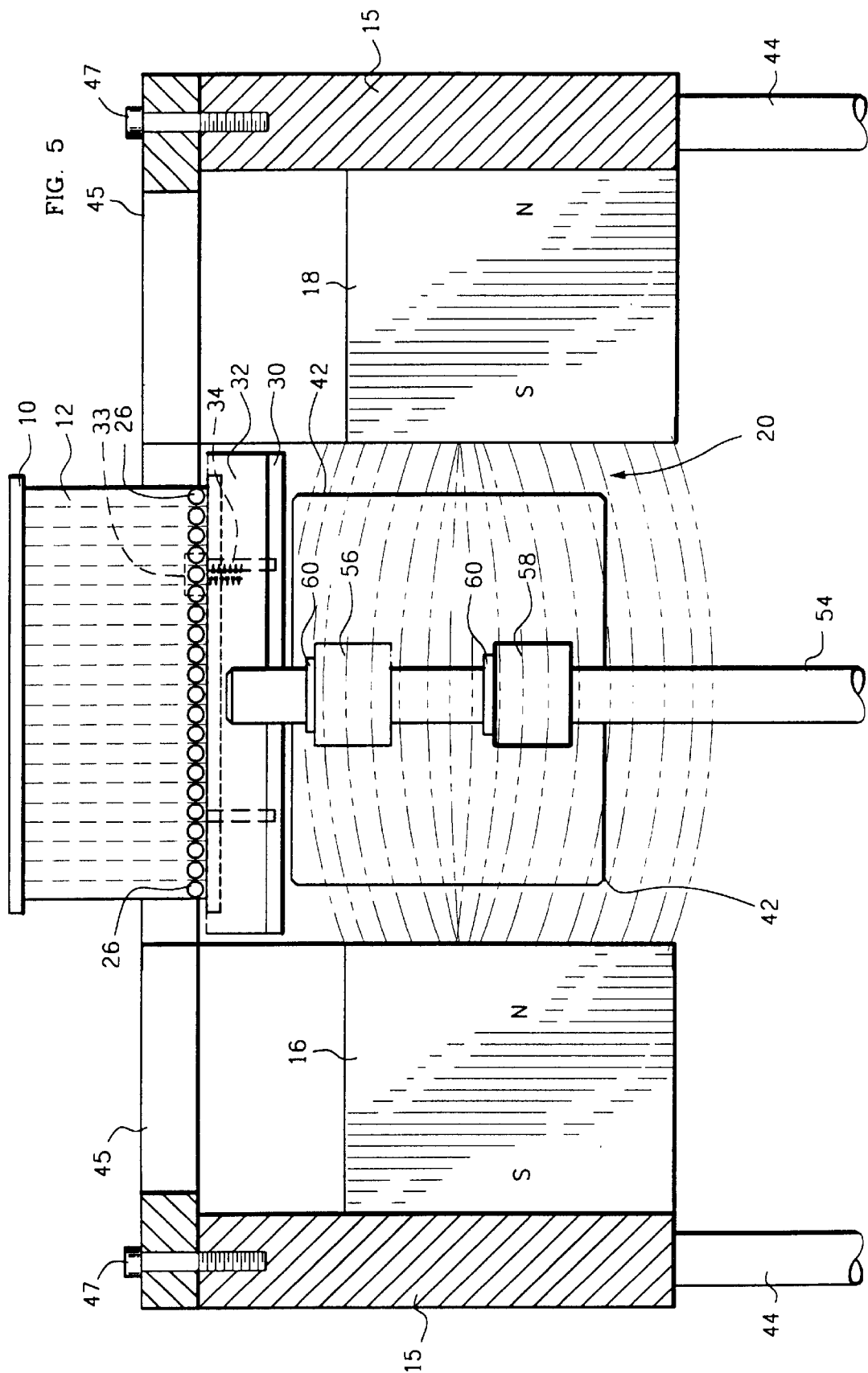
FIG. 5 illustrates an end view of magnetically pulled down stir balls in a deep well microplate on the Elevator Version.

FIG. 5 illustrates how stir balls (26) are pulled down to the bottom of the wells (12) when the platform is raised to the top of the dipole focused levitation magnetic field (20) of elevator levitation magnets (16 & 18). Thus a single and very powerful magnetic field (20) is used both to levitate and pull down the stir balls.

Figure 6:
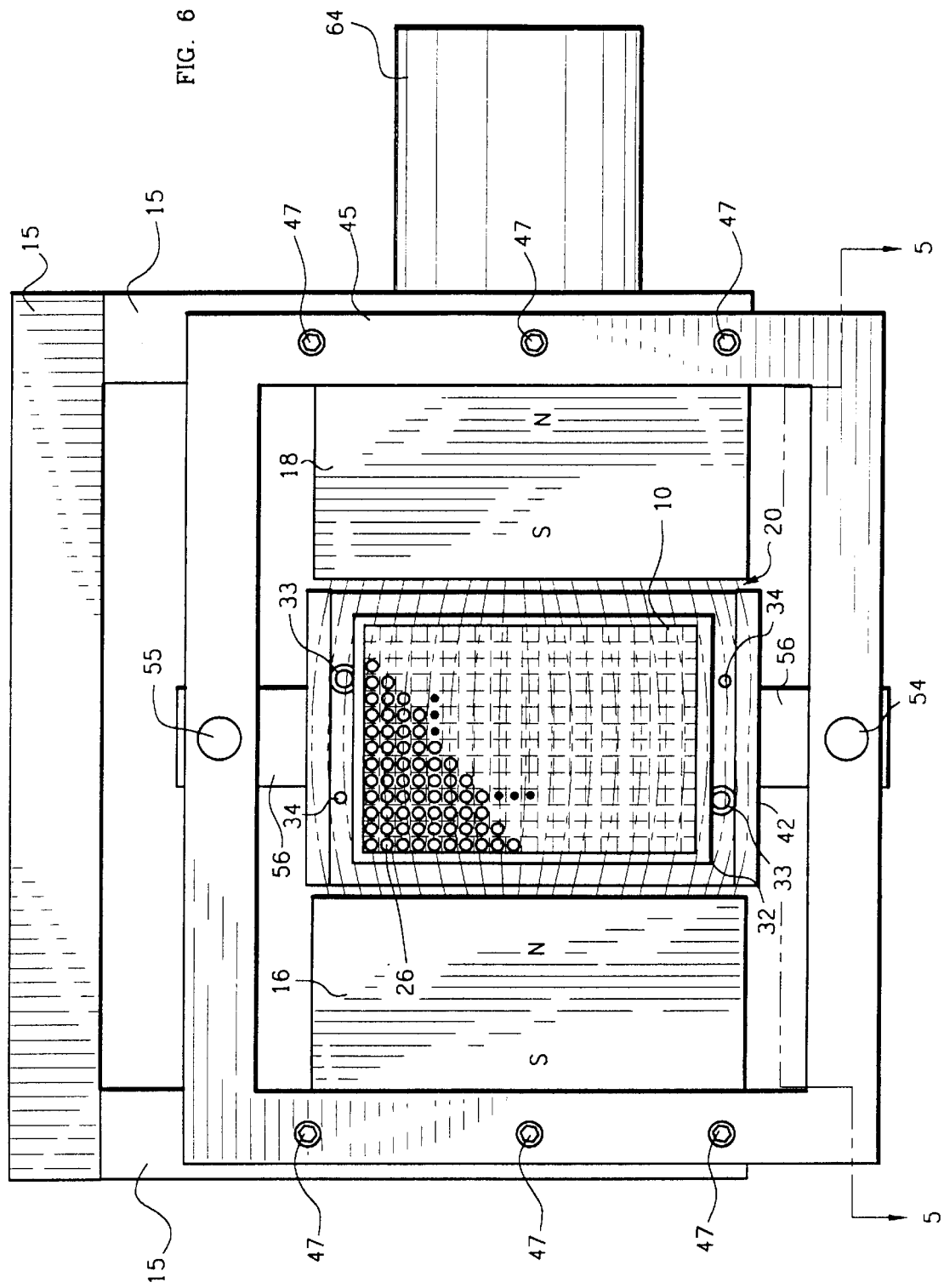
FIG. 6 illustrates an exposed top view of the Elevator Version form of the invention.

FIG. 6 is a top view of the Elevator Version that illustrates how the slide rail support (45) is attached to the steel dipole structures (15) with bolts (47) to stabilize the top end of the slide rails (54 & 55) and maintain precise slide rail positioning. The rectangular opening created by this design of the slide rail support (45)provides easy access to the microplate (10).

Figure 7:
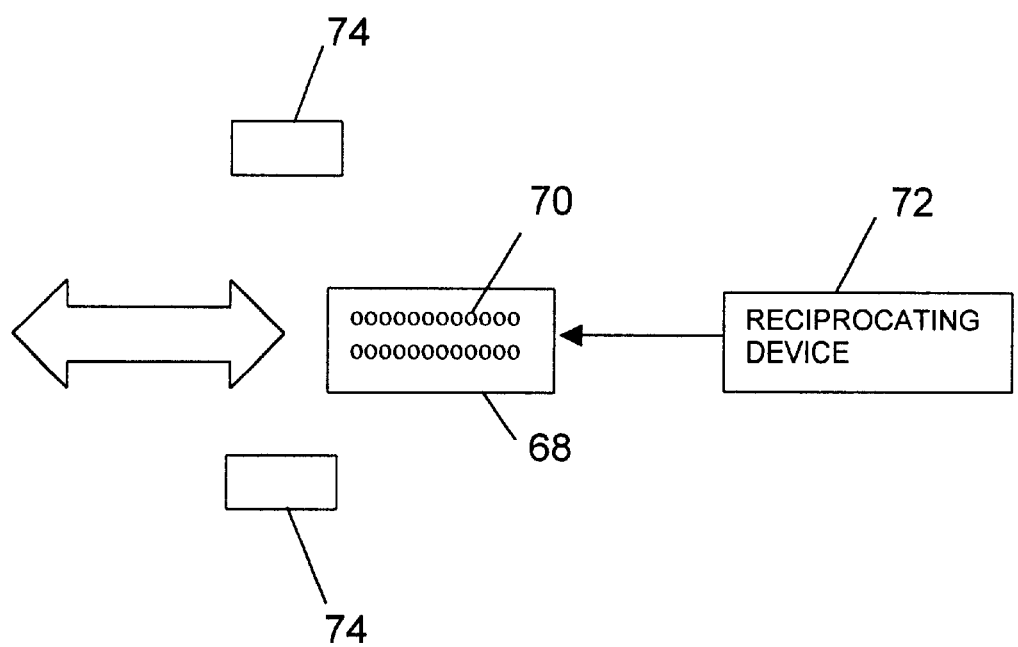
FIG. 7 is a schematic diagram of an alternative embodiment in which there is reversing lateral movement or back-and-forth horizontal movement.

Referring to FIG. 7, in an alternative embodiment, a reversing lateral movement plate 68 supporting the vessels 70 is coupled to a reciprocating device 72 for effecting reversing lateral movement or back-and-forth horizontal movement through a horizontally focused magnetic levitation field between a pair of magnetic dipoles 74.

CONCLUSIONS, RAMIFICATIONS, AND SCOPE

Accordingly, it can be seen that magnetic levitation stirring provides a very simple, economical and robust method of stirring thousands of vessels or microplate wells simultaneously. The size and shape of the vessel or well to be stirred is easily accommodated with adaptable size and shaped stirrers or using multiple stirrers/vessel. Straightforward methods of adding and removing the stirrers from the wells have been developed to facilitate the process. The speed of the stirring action is completely operator controlled or can be linked to a computer for complex procedures. By adjusting the levitation height and the depth of the liquid, the stirrers can be made to levitate through the liquid's meniscus thus increasing aeration. Liquids with dissimilar viscosities may be mixed at the same time within different wells of the same microplate without the stirrers being "thrown out of synchronization". These elements are key in the miniaturization of processes that require aeration and mixing.

Although the description above contains two versions, these should not be construed as limiting the scope of the invention, but as merely providing illustrations of some of the presently preferred embodiments of this invention. Various other embodiments and ramifications are possible within it's scope. For example, the lateral motion may be effected by the reciprocating action of a crank shaft or the reversing of a linear drive or ball screw. Also electromagnetic magnets may be used instead of permanent magnets. Instead of moving the vessels the magnets may be moved, or electromagnets may be pulsed on and off to levitate the stir devices. The dimension and shape of the levitation stir device, the number of reaction chambers that may be accommodated, the size, strength, number and location of the magnets used may be varied to produce different stirring effects depending upon the size and shape of the wells, as well as the size, shape, number and magnetic orientation of the stirrers.

Thus the scope of the invention should be determined by the appended claims and their legal equivalents, rather than by the examples given.

Thus having described our invention we claim:

1. A system for mixing liquid and/or solid contents of an array of vessels, comprising
    means for receiving the array of vessels;
    magnetic stirrers disposed within respective vessels of the array; and
    means disposed in relation to the receiving means for subjecting the received array of vessels to a magnetic field that causes magnetic stirrers within respective vessels of the array to levitate at variable levels within the contents of said respective vessels, whereby the contents of said respective vessels are mixed by said variable-level levitations of the magnetic stirrers therein;
    wherein the subjecting means comprise
    a circular array of a plurality of pairs of separated magnetic poles, wherein each pair is disposed for focusing a magnetic field within a space between the respective pair of poles; and
    a carousel for moving the received array of vessels through the respective spaces between the respective pairs of poles to thereby levitate the magnetic stirrers when the respective vessels are within said respective spaces; and
    wherein the magnetic stirrers are stir balls.

2. A system according to claim 1, wherein the magnetic stirrers are elongated; and
    wherein adjacent pairs of the plurality of pairs of separated magnetic poles are disposed for focusing magnetic fields of opposite South-North and North-South polarities to thereby cause the magnetic stirrers to reverse their orientation and rotate polarly within the respective vessels by aligning in accordance with the magnetic polarities of alternating South-North and North-South magnetic fields as the array of vessels moves through the respective spaces between the adjacent pairs of separated magnetic poles to thereby effect horizontal stirring of the contents of said respective vessels.

3. A system according to claim 1, further comprising
    a plurality of pull-down magnets respectively disposed beneath the carousel between different pairs of poles so that said movement of the respective vessels by the carousel moves the array of vessels over one of the pull-down magnets subsequent to movement of the array of vessels through the space between one of the pairs of poles to thereby pull the magnetic stirrer within each vessel of said respective vessels toward the bottom of each said vessel.

4. A system according to claim 1, further comprising the array of vessels, wherein the array of vessels are embodied as wells in a microplate and are received by the receiving means.

5. A system according to claim 1, wherein the vessels are cylindrical and the stir balls have diameters that are nearly the same as the diameters of the respective vessels in which the stir balls are disposed.

6. A system for mixing liquid and/or solid contents of a plurality of arrays of vessels, comprising
   a plurality of array receiving means for receiving the plurality of arrays of vessels; and
   means disposed in relation to the plurality of receiving means for subjecting the received arrays of vessels to a magnetic field that causes magnetic stirrers within respective vessels of the arrays to levitate at variable levels within the contents of said respective vessels, whereby the contents of said respective vessels are mixed by said variable-level levitations of the magnetic stirrers therein;
   wherein the subjecting means comprise
   a circular array of a plurality of pairs of separated magnet poles, wherein magnets of each pair are disposed for focusing a magnetic field within a space between the respective pair of poles; and
   a carousel for moving the received arrays of vessels seriatim through the respective spaces between the respective pairs of poles to thereby levitate the magnetic stirrers when the respective vessels are within said respective spaces; and
   a plurality of pull-down magnets respectively disposed beneath the carousel between different pairs of poles so that said movement of the respective vessels by the carousel moves each array of vessels over one of the pull-down magnets subsequent to movement of the array of vessels through the space between one of the pairs of poles to thereby pull the magnetic stirrer within each vessel of said respective vessels toward the bottom of each said vessel.

7. A system according to claim 6, wherein the plurality of array receiving means are so disposed on the carousel that the carousel moves a first said array of vessels over one of the pull-down magnets while moving a second array of vessels through the space between one of the pairs of poles.

8. A system according to claim 6, wherein the plurality of array receiving means are so disposed on the carousel that the carousel moves a first said array of vessels over one of the pull-down magnets and moves a second array of vessels through the space between one of the pairs of poles while moving a third array of vessels from the space between said one of the pairs of poles to a space over said one of the pull-down magnets.

9. A system according to claim 6, further comprising magnetic stirrers disposed within said respective vessels.

10. A system according to claim 6, further comprising the arrays of vessels, wherein the arrays of vessels are embodied as wells in microplates and are received by the receiving means.

11. A system for mixing liquid and/or solid contents of an array of vessels with magnetic stirrers, comprising
    a pair of magnetic poles disposed for focusing a magnetic field within a space between the poles;
    means for receiving the array of vessels;
    wherein the receiving means are disposed for a relative vertical movement through the space between the pair of poles that results in the focused magnetic field causing magnetic stirrers within respective vessels of the received array to levitate at variable levels within the contents of said respective vessels as the received vessels are moved through said space and thereby mix said contents; and
    means for coupling a motor to the receiving means or the pair of magnetic poles for effecting said relative vertical movement.

12. A system according to claim 11, consisting of said pair of magnetic poles, said receiving means; and said coupling means.

13. A system according to claim 12, further comprising the array of vessels, wherein the array of vessels are embodied as wells in a microplate and are received by the receiving means.

14. A system according to claim 11, further comprising magnetic stirrers for placement within said respective vessels.

15. A system for mixing liquid and/or solid contents of an array of vessels with magnetic stirrers, comprising:
    a pair of magnetic poles disposed for focusing a magnetic field within a space between the poles;
    a pull-down magnet disposed apart horizontally from and beneath the level of the pair of magnetic poles;
    means for receiving the array of vessels;
    wherein the receiving means are disposed for a relative horizontal movement through the space between the pair of poles that results in the focused magnetic field causing magnetic stirrers within respective vessels of the received array to levitate at variable levels within the contents of said respective vessels as the received vessels are moved horizontally through said space and thereby mix said contents, and for a movement over the pull-down magnet that results in the magnetic stirrer within each vessel of said respective vessels being pulled toward the bottom of each said vessel; and
    means for coupling a drive means to the receiving means for effecting said movements.

16. A system according to claim 15, wherein the relative horizontal movement is back-and-forth.

17. A system according to claim 15, in combination with magnetic stirrers for placement within said respective vessels.

18. A system according to claim 15, further comprising the array of vessels, wherein the array of vessels are embodied as wells in a microplate and are received by the receiving means.

19. A system for mixing liquid and/or solid contents of an array of vessels with magnetic stirrers, comprising:
    a pair of magnetic poles disposed for focusing a magnetic field within a space between the poles;
    means for receiving the array of vessels;
    wherein the receiving means are disposed for a relative horizontal movement through the space between the pair of poles that results in the focused magnetic field causing magnetic stirrers within respective vessels of the received array to levitate at variable levels within the contents of said respective vessels as the received vessels are moved horizontally through said space and thereby mix said contents;
    means for coupling a drive means to the receiving means or the pair of magnetic poles for effecting said relative horizontal movement; and
    magnetic stirrers disposed within said respective vessels;
    wherein the magnetic stirrers are stir balls.

20. A system according to claim 19, wherein the relative horizontal movement is back-and-forth.

21. A system according to claim 19, further comprising the array of vessels, wherein the array of vessels are embodied as wells in a microplate and are received by the receiving means.

22. A system according to claim 19, wherein the vessels are cylindrical and the stir balls have diameters that are nearly the same as the diameters of the respective vessels in which the stir balls are disposed.

* * * * *